United States Patent
Karmakar et al.

(10) Patent No.: US 12,464,199 B2
(45) Date of Patent: Nov. 4, 2025

(54) SYSTEM AND METHOD FOR AUTOMATED VIDEO GENERATION FOR TRAINING OF MACHINE LEARNING ALGORITHMS IN AVIATION ENVIRONMENTS

(71) Applicant: B/E Aerospace, Inc., Winston-Salem, NC (US)

(72) Inventors: Bikramjit Karmakar, Bangalore (IN); Rajdeep Sawant, Hyderabad (IN); Yogesh Selvaraj, Bangalore (IN); Amrit Chatterjee, Hyderabad (IN); Lennon Ignatius Dhanaraj, Bangalore (IN); Hemant Kumar, Hyderabad (IN); Victor Vishal Rana, Bangalore (IN); Subhashish Chakravarty, Marion, IA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 169 days.

(21) Appl. No.: 18/116,706

(22) Filed: Mar. 2, 2023

(65) Prior Publication Data
US 2024/0031658 A1    Jan. 25, 2024

(30) Foreign Application Priority Data
Jul. 20, 2022 (IN) .............................. 202241041633

(51) Int. Cl.
*H04N 21/81*  (2011.01)
*G06T 7/50*   (2017.01)
(Continued)

(52) U.S. Cl.
CPC ............. *H04N 21/816* (2013.01); *G06T 7/50* (2017.01); *G06T 7/70* (2017.01); *G06T 13/40* (2013.01); *G06V 20/59* (2022.01)

(58) Field of Classification Search
CPC ........... H04N 21/816; G06T 7/50; G06T 7/70; G06T 13/40; G06V 20/59
See application file for complete search history.

(56) References Cited

U.S. PATENT DOCUMENTS 9,280,719 B2    3/2016  Criminisi et al.
10,235,601 B1   3/2019  Wrenninge et al.
(Continued)

FOREIGN PATENT DOCUMENTS

CN    113537359 A    10/2021
KR  1020200087338 A   7/2020

OTHER PUBLICATIONS

Extended European Search Report dated Mar. 12, 2024; European Application No. 23186676.5.
(Continued)

*Primary Examiner* — Kee M Tung
*Assistant Examiner* — Khoa Vu
(74) *Attorney, Agent, or Firm* — Suiter Swantz IP

(57) ABSTRACT

A system and method for automated video generation for training machine and deep learning algorithms in aviation environments generates photorealistic digital human characters and an aviation environment according to a desired scenario, including fixtures, free objects, lighting and physics configurations, and camera views. Character actions in the desired scenario are mapped to pose sequences which may be manually generated or transferred from image sequences of human activities, including both main character activities specified by the scenario, characters responding to the main characters, and background character actions. A video automation pipeline animates character actions performed by the digital human characters into video datasets with annotation files incorporating detailed pixel and depth information for each frame. Video datasets may include variant video datasets differentiated from the primary dataset
(Continued)

by changes in domain variants (e.g., character attributes, environmental attributes) while preserving the portrayal of the desired scenario.

18 Claims, 7 Drawing Sheets

(51) Int. Cl.
*G06T 7/70* (2017.01)
*G06T 13/40* (2011.01)
*G06V 20/59* (2022.01)

(56) References Cited

U.S. PATENT DOCUMENTS

| | | | |
|---|---|---|---|
| 11,024,032 B1 | 6/2021 | Landron-Rivera et al. | |
| 11,164,319 B2 | 11/2021 | Steele | |
| 11,195,023 B2 | 12/2021 | Lloyd et al. | |
| 11,386,800 B1* | 7/2022 | Moy | G06N 3/08 |
| 2011/0241902 A1* | 10/2011 | Shavit | G08G 5/0043 |
| | | | 340/978 |
| 2012/0330880 A1 | 12/2012 | Arasu et al. | |
| 2016/0247101 A1* | 8/2016 | Agrawal | B64D 47/08 |
| 2019/0009133 A1 | 1/2019 | May | |
| 2019/0177004 A1* | 6/2019 | Skelly | G06T 5/00 |
| 2021/0374552 A1* | 12/2021 | Mallya | G06N 3/088 |
| 2021/0398337 A1 | 12/2021 | McDuff et al. | |
| 2022/0028026 A1 | 1/2022 | Richter et al. | |
| 2023/0120829 A1* | 4/2023 | Hernando | G06V 10/74 |
| | | | 382/103 |
| 2023/0335138 A1* | 10/2023 | Nusbaum | G10L 17/22 |

OTHER PUBLICATIONS

Hong Wenyi et al.: "CogVideo: Large-scale Pretraining for Text-to-Video Generation via Transformers", arXiv (Cornell University), May 29, 2022. Retrieved from the Internet: URL:https://arxiv.org/pdf/2205.15868.pdf.

Singh Aditi: "A Survey of AI Text-to-Image and AI Text-to-Video Generators", 2023 4th International Conference on Artificial Intelligence, Robotics and Control (AIRC), IEEE, May 9, 2023, pp. 32-36.

Wu Chenfei et al: "N/" UWA: Visual Synthesis Pre-training for Neural Visual Wordl Creation, arXiv (Cornell University), Nov. 24, 2021; Retrieved from Internet: URL:https://arxiv.org/pdf/2111.12417.pdf.

Richter, S.R., Vineet, V., Roth, S., Koltun, V. (2016). Playing for Data: Ground Truth from Computer Games. In: Leibe, B., Matas, J., Sebe, N., Welling, M. (eds) Computer Vision—ECCV 2016. ECCV 2016. Lecture Notes in Computer Science( ), vol. 9906. Springer, Cham.

\* cited by examiner

SYSTEM AND METHOD FOR AUTOMATED VIDEO GENERATION FOR TRAINING OF MACHINE LEARNING ALGORITHMS IN AVIATION ENVIRONMENTS

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

Indian Provisional Patent Application No. 202241041633 filed Jul. 20, 2022 relating to SYSTEM AND METHOD FOR AUTOMATED VIDEO GENERATION FOR TRAINING OF MACHINE LEARNING ALGORITHMS IN AVIATION ENVIRONMENTS.

Said Indian Provisional Patent Application No. 202241041633 is herein incorporated by reference in its entirety.

BACKGROUND

Computer vision involves, at a high level, the simulation of human (or animal) visual processing in a non-organic environment. For example, computer vision includes not only the acquisition of images but also: the identification of each element of an image and how these elements relate to each other; time context between frames, and throughout a sequence of frames, of a sequence of images; and a deeper understanding of the actions depicted by the sequence of images. Machine learning and deep learning algorithms are useful for training and advancing predictive computer vision models, but machine learning models are only as good as their foundational visual data. Where there is insufficient domain-specific data, the domain-specific data must be created. For domain-specific data to be useful in a machine learning context, the data must be correct, properly and thoroughly annotated (e.g., accurately indicative of its contents and/or component elements), unbiased, new (e.g., not reused), and thorough—ideally, the more useful visual data, the better.

However, visual data collection, particularly video data comprising image streams and sequences, is expensive and cumbersome to collect. Video dataset collection requires specialized hardware and high setup overhead (e.g., if the intent is to recreate a broad variety of potential environments or scenarios). Further, where the collection process involves third party or personal data (e.g., if the identities of private individuals are at least partially depicted) reluctance to share data and personal privacy guidelines provide further barriers.

SUMMARY

In a first aspect, a system for automated video generation is disclosed. In embodiments, the system includes a memory for storing encoded instructions and one or more processors configurable by the encoded instructions. For example, the system receives a desired scenario wherein a set of character actions are performed within a particular aviation environment. The system includes a graphics engine for generating a set of digital human characters capable of performing the set of character actions, where each digital human character has a photorealistic human appearance and is assigned a set of human attributes and aviation attributes (e.g., character roles). The graphics engine generates a photorealistic representation of the aviation environment, including an interior or exterior space, fixtures positioned within the space, free objects positioned within the space (but not fixed thereto), and environmental attributes for the space (e.g., lighting, physics, camera view (or the perspective from which a scene is seen)). A pose estimation subsystem translates the desired character actions into character movements based on character poses or sequences of poses. A video automation pipeline generates a video dataset for the desired scenario, wherein the character actions are animated as performed by the digital human characters within the specified aviation environment. The video dataset includes an annotation file including pixel locations and pixel depth for each digital human character, each fixture, and each free object portrayed, as well as annotation data for each character action.

In some embodiments, the digital human characters include main characters and auxiliary characters (e.g., non-player characters (NPC)). Main characters perform the desired character actions in the foreground while auxiliary characters may perform adaptive actions reacting to the main characters and character actions performed thereby, as well as background actions independent of the foreground character actions.

In some embodiments, the aviation environment is an aircraft, and the physics configuration modifies gravity, air pressure, and/or aircraft orientation based on the current flight segment (e.g., takeoff, climb, cruise), current atmospheric conditions (e.g., wind, weather), or aircraft maneuvers.

In some embodiments, the aviation environment is a cockpit, galley, lavatory, or passenger cabin.

In some embodiments, character poses are adapted from reference images (e.g., still images, image streams, video) of a human subject.

In some embodiments, the video dataset includes a primary dataset portraying the desired scenario and variant video datasets also portraying the desired scenario. Each variant video dataset, however, differs from the primary dataset according to one or more domain variations, e.g., different free objects; different environmental attributes; different human attributes assigned to digital human characters.

In some embodiments, domain variations include variations in the location of free objects within the aviation environment or a selection of free objects within a video dataset (e.g., appearance or non-appearance of particular objects).

In some embodiments, assigned human attributes include gender, ethnicity, age, physical build, and dress style.

In some embodiments, assigned aviation attributes include character roles, e.g., a digital human character is a pilot, command crewmember, flight attendant, or passenger.

In a further aspect, a computer-implemented method for automated video generation is disclosed. In embodiments, the method includes receiving a desired scenario wherein a set of desired character actions are performed within an aircraft cabin, cockpit, or other aviation environment. The method includes generating a set of digital human characters to perform the desired character actions, wherein each digital human character has a photorealistic human appearance, assigned human attributes, and assigned aviation attributes. The method includes generating a photorealistic representation of the aviation environment, e.g., an aviation space including fixtures and free objects placed within and assigned specific environmental qualities such as lighting settings, physics configuration, and a camera perspective (e.g., a point of view from which the aviation environment, and the characters within, are seen). The method includes generating character movements based on the desired character actions, wherein each character movement is based on a character pose or sequence of poses. The method includes generating a video dataset based on the desired scenario wherein the character actions are performed by animated digital human characters within the specified aviation environment. The video dataset includes an annotation file specifying pixel location and pixel depth for each digital human character, fixture, and free object portrayed, as well as annotation data for each character action.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
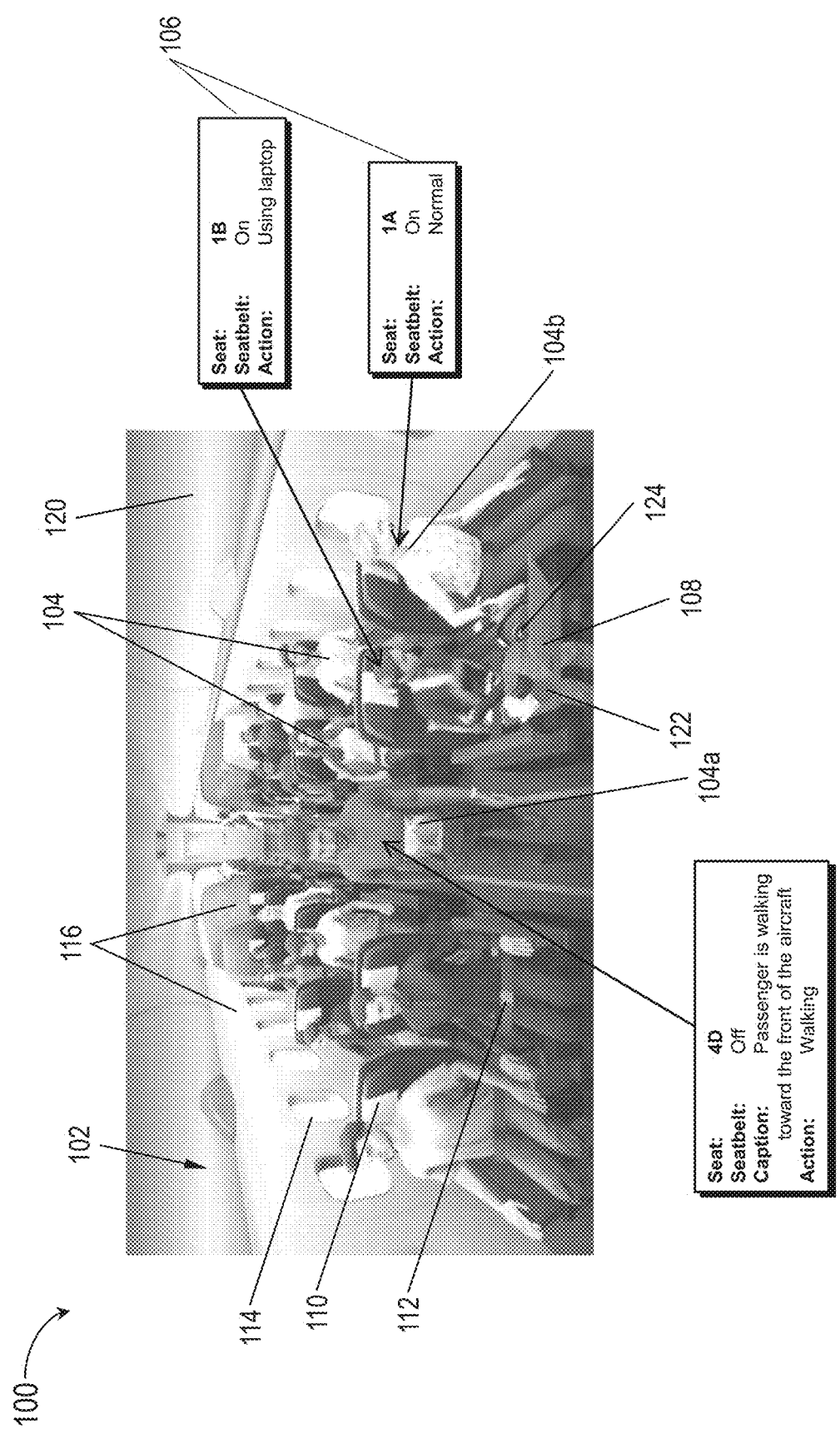
FIG. 1 is an illustration of an annotated frame of a video dataset auto-generated according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to methods and systems for automated synthetic generation of aviation-specific video datasets for training deep learning and/or machine learning models, e.g., for computer vision systems. For example, the methods and systems disclosed herein generate libraries of photorealistic digital human characters and photorealistic aviation environments. Digital human characters are not tied to specific human individuals, but have realistic human appearances and are trained (e.g., as artificial intelligences) to act and behave as would an equivalent human in specific aviation scenarios. Given one or more selected digital human characters, an environment (e.g., an aircraft cockpit or cabin), and a scenario, the system generates photorealistic video sequences portraying the selected characters acting out the desired scenario within the desired environment, each video sequence including detailed annotation data describing the visual elements and actions depicted. The system may further provide sets of related video sequences among which selected visual elements are differentiated so that machine learning algorithms may be trained to recognize minor variations on a common scenario.

Referring to FIG. 1, a video dataset 100 generated according to embodiments of the inventive concepts disclosed herein is shown. The video dataset 100 (e.g., each individual frame or image excerpted therefrom) may include an aviation environment 102, digital human characters 104, and annotation data 106.

In embodiments, each video dataset 100 may include one or more digital human characters 104 within an aviation environment 102, performing specific character actions in fulfillment of a desired scenario depicted by the video dataset. For example, graphics generation processors (e.g., UnrealEngine) may create a library of digital human characters 104. In embodiments, each digital human character 104 may have a photorealistic human appearance. However, the character may be characterized as "digital human" in the sense that the digital human characters do not correspond in appearance to any identifiable human individual. For example, each digital human character 104 may be generated according to a customizable set of human attributes. Digital human characters 104 may be differentiated from each other broadly according to racial, ethnic, age/maturity, posture, gait, and/or gender characteristics. Further, digital human characters 104 may be more broadly distinctive according to their assigned vital statistics, facial features, articles of clothing, and/or behavior patterns (any of which may also be varied and/or customized to a specific instance of a digital human character). For example, each digital human character 104 may be assigned a broad set of behavior patterns or attributes, e.g., introverted/extroverted, passive/aggressive, compliant/defiant, which in turn may influence the performance of a specific character action or sequence of actions by that digital human character.

In embodiments, each digital human character 104 may additionally be assigned an aviation-specific attribute that may influence or dictate any character actions performed by that digital human character according to a desired scenario. For example, if the aviation environment 102 depicted by the video dataset 100 is an aircraft passenger cabin, each digital human character 104 may be a passenger or a cabin crewmember. Similarly, if the aviation environment 102 is an aircraft cockpit, each digital human character 104 may be a command crewmember, e.g., a pilot, co-pilot, navigator, or flight engineer.

In embodiments, the set of digital human characters 104 associated with the video dataset 100 may include one or more main characters 104a and one or more auxiliary characters 104b. For example, the main characters 104a may perform specific character actions relevant to the desired scenario portrayed by the video dataset 100; e.g., a main character 104a may be depicted as having left their assigned seat and currently walking along an aisle in the passenger cabin. In embodiments, as provided for by the desired scenario, auxiliary characters 104b may include responsive characters and background characters. For example, responsive characters may perform character actions directly responsive to the actions performed by the main character/s 104a; e.g., if the main character is a seated passenger depicted as activating a call light or signal to request a cabin crewmember, a responsive character may be a cabin crewmember depicted as walking to the passenger's seat in response to the request. In embodiments, background characters may perform character actions not directly related to the character actions performed by the main character/s 104a, but consistent with the desired scenario. For example, if the auxiliary characters 104b shown in FIG. 1 include other seated passengers, some of these seated passengers may remain seated while others are randomly assigned additional background character actions, e.g., unfastening seat belts or using a laptop computer 108.

In embodiments, the aircraft environment 102 selected for the video dataset 100 may depict an exterior space or an interior space. For example, the aircraft environment 102 may include a portion of an aircraft, e.g., the passenger cabin shown by FIG. 1, a portion of the passenger cabin (e.g., a class of seats, an exit row), a cockpit or other control area, a galley space, a lavatory, or a cargo hold; depending on the desired scenario, the aircraft may or may not be depicted as inflight. In some embodiments, the aircraft environment 102 may include a non-aircraft space, e.g., a factory floor, a runway environment, or an airport environment (control tower, lobby, security checkpoint, gate).

In embodiments, the aircraft environment 102 associated with a particular video dataset 100 may include both fixed and customizable attributes. For example, if the aircraft environment 102 is a passenger cabin as shown by FIG. 1, the passenger cabin may include fixtures, e.g., features or components in fixed positions and/or orientations relative to the aircraft environment. For example, the passenger cabin may include seats 110, seatbelts 112, windows 114, bulkheads/dividers 116, tray tables 118, and/or overhead bins 120. In embodiments, character actions performed by digital human characters 104 may include interacting with one or more fixtures, e.g., walking along an aisle, fastening/unfastening a seatbelt 112, or looking out a window 114.

In embodiments, the aircraft environment 102 may include free objects not associated with fixed positions relative to the aircraft environment. For example, the video dataset 100 may include, based on the desired scenario, a randomized placement of free objects throughout the aircraft cabin, e.g., a laptop computer 108, water bottle 122, headphones 124. In embodiments, free objects may also be interacted with by the digital human characters 104; further, free objects may be more susceptible to changes in environmental physics than fixtures. Food trolleys, for example, may be treated as fixtures if firmly secured in a cart bay (e.g., in a galley scenario) but as free objects if inserted into an aisle of a passenger cabin (where they may be subject to changes in orientation or gravity driven by aircraft physics). Similarly, overhead cargo bins are fixtures, but any luggage or personal items stowed within the cargo bins are free objects; note however that the bin doors are also fixtures but may be subject to limited free object movement in an open, non-secured state.

In embodiments, the video dataset 100 may include a physics configuration driven by a variety of customizable factors. For example, the physics configuration may be based on a particular altitude or flight segment, e.g., takeoff, climb, cruise, descent, landing, emergency descent or landing, which may drive how digital human characters 104 and free objects are affected by gravity (e.g., fixtures may remain stable while the aircraft is in an unusual orientation or under unusual gravitational conditions, but digital human characters and free objects not otherwise fixed to the aircraft cabin may not) or by air pressure. Similarly, the physics configuration may be affected by atmospheric conditions (e.g., level flight at cruise as opposed to turbulence) or by aircraft maneuvers, e.g., turns, sharp descents, deployment of oxygen masks, and/or other deliberate adjustments to aircraft configuration.

In embodiments, the video dataset 100 may include annotation data 106 for each individual element depicted by the video dataset (e.g., the aviation environment 102, digital human characters 104, character actions). For example, annotation data 106 may provide, for each digital human character 104 or element of the aviation environment 102, pixel segmentation data and depth data as described below.

Further, annotations 126 may provide deep learning algorithms with additional information relevant to digital human characters 104, e.g., their assigned seats 110, whether their seatbelts 112 are fastened or unfastened, and/or any character actions performed by or associated with that character.

Figure 2:
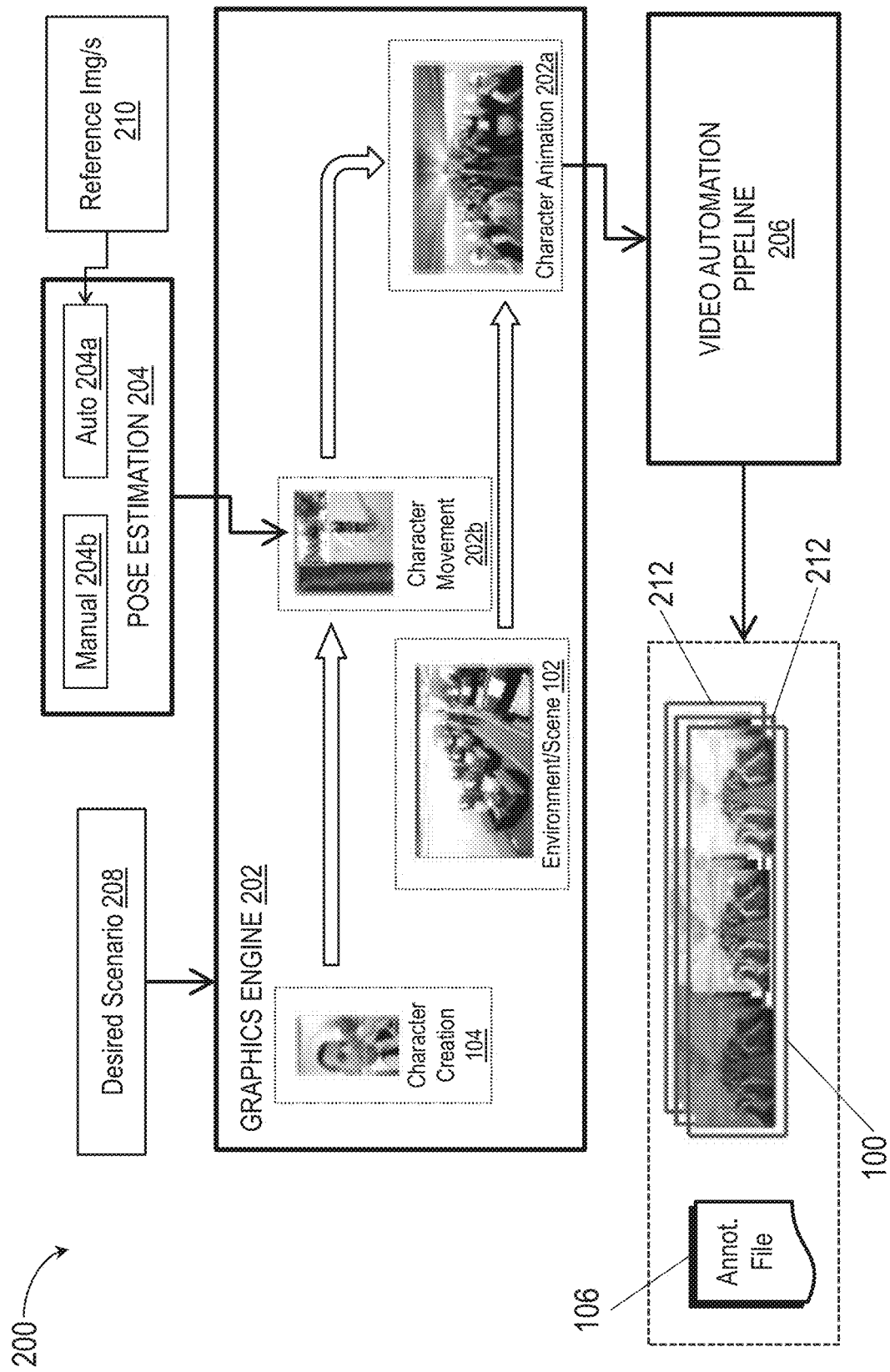
FIG. 2 is a diagrammatic illustration of components of a system for automated video generation according to example embodiments of this disclosure.

Referring now to FIG. 2, a system 200 for automated video generation may include a graphics engine 202, pose estimation module 204, and video automation pipeline 206.

In embodiments, the graphics engine 202 may include one or more graphics generation processors configured for creating a library of digital human characters (104, FIG. 1) and/or aviation environment (102, FIG. 1) as described above. For example, the graphics engine 202 may receive a desired scenario 208 and create customized digital human characters 104 and an aviation environment 102 in response to that specific scenario. In some embodiments, the graphics engine 202 may adapt digital human characters 104 and/or an aviation environment 102 from a library, assigning each character a set of human attributes and/or aviation-specific attributes (and the aviation environment a set of environmental attributes) as described above. Further, the graphics engine 202 may generate a scene based on the desired scenario 208 by assigning character actions to each digital human character 104 and environmental attributes to the aviation environment 102. For example, the graphics engine 202 may create animation 202*a* for each digital human character 104 based on the generated poses and movements 202*b* corresponding to each desired character action. Further, the graphics engine 202 may create a scene based on attributes of the aviation environment 102 (e.g., lighting, perspective, physics, character design attributes) which may vary from one video dataset to another, while the fundamental character actions outlined in the desired scenario 208 remain constant.

In embodiments, the pose estimation module 204 may develop character poses rendered by the graphics engine 202 as character movements 202*b* for each character action. For example, given a set of character actions provided for by the desired scenario 208, including actions to be performed by a main character (104*a*, FIG. 1) or by other characters portrayed in the scene (e.g., auxiliary characters (104*b*, FIG. 1) responding to the actions of the main character, and other auxiliary characters performing independent background actions), the pose estimation module 204 may provide a series of human poses (e.g., a position and/or orientation of each digital human character 104, including its torso, limbs, extremities, facial expressions) from which each set of character movements 202*b* may be assembled. In some embodiments, automatic pose transfer (204*a*) may adapt character poses based on reference video and images (210). Alternatively or additionally, manual pose estimation (204*b*) may allow for manual generation of character poses if no equivalent reference poses can be found.

In embodiments, based on digital human characters 104, aviation environments 102, character actions, and component character poses (including movements 202*b* and animations 202*a*) assigned to the desired scenario 208, the video automation pipeline 206 may generate a video dataset 100 rendering the specified desired scenario. For example, the video dataset 100 may provide for a particular lighting configuration (e.g., normal daytime cabin lighting; lighting configurations may define lighting intensity or positioning, and may be dependent on whether the scenario is indoor or outdoor (e.g., incorporating natural and artificial light sources)), camera view (e.g., center-aisle position, oriented aft and downward), and physics configuration (e.g., consistent with an aircraft at cruising altitude, normal atmospheric conditions) according to defined environmental attributes. Further, the video dataset 100 may portray the selected digital human characters 104 performing any character actions (e.g., main, responsive, background) assigned to them in fulfillment of the desired scenario 208. In some embodiments, the video automation pipeline 206 may generate a set of variant video datasets 212 based on the video dataset 100. For example, each variant video dataset 212 may each portray the same desired scenario 208 as the video dataset 100, but each individual variant video dataset 212 may be differentiated from the other variant video datasets within the set according to domain variations. Each variant video dataset 212 may incorporate the same digital human characters 104 and aviation environment 102 (e.g., as the original video dataset 100) in addition to the desired scenario 208, but each individual variant video dataset 212 may be generated according to a different set of domain variations (e.g., assigned human attributes, assigned aviation attributes, assigned environmental attributes, assigned lighting configurations, assigned physics configurations, assigned visual attributes of fixtures, assigned placement of free objects). For example, if the original video dataset 100 portrays a male main character 104*a* walking forward along a central aisle of a passenger cabin toward a forward lavatory (e.g., as shown by FIG. 1), each additional variant video dataset 212 may include one or more programmatic or domain variations, e.g., a female main character walking forward towards the forward lavatory; the male main character walking forward toward the forward lavatory, but seen from a different camera view; the male main character walking forward toward the forward lavatory, but seen under different cabin lighting; the male main character walking forward toward the forward lavatory, but dressed differently; the male main character walking forward toward the forward lavatory, but in a different aircraft configuration (e.g., A320 interior cabin vs. B737 interior cabin); the male main character walking forward toward the forward lavatory, but seen against a different cabin design scheme. Any domain variations among individual variant video datasets 212 may be indicated by the annotation files 106 for each video dataset.

Figure 3A:
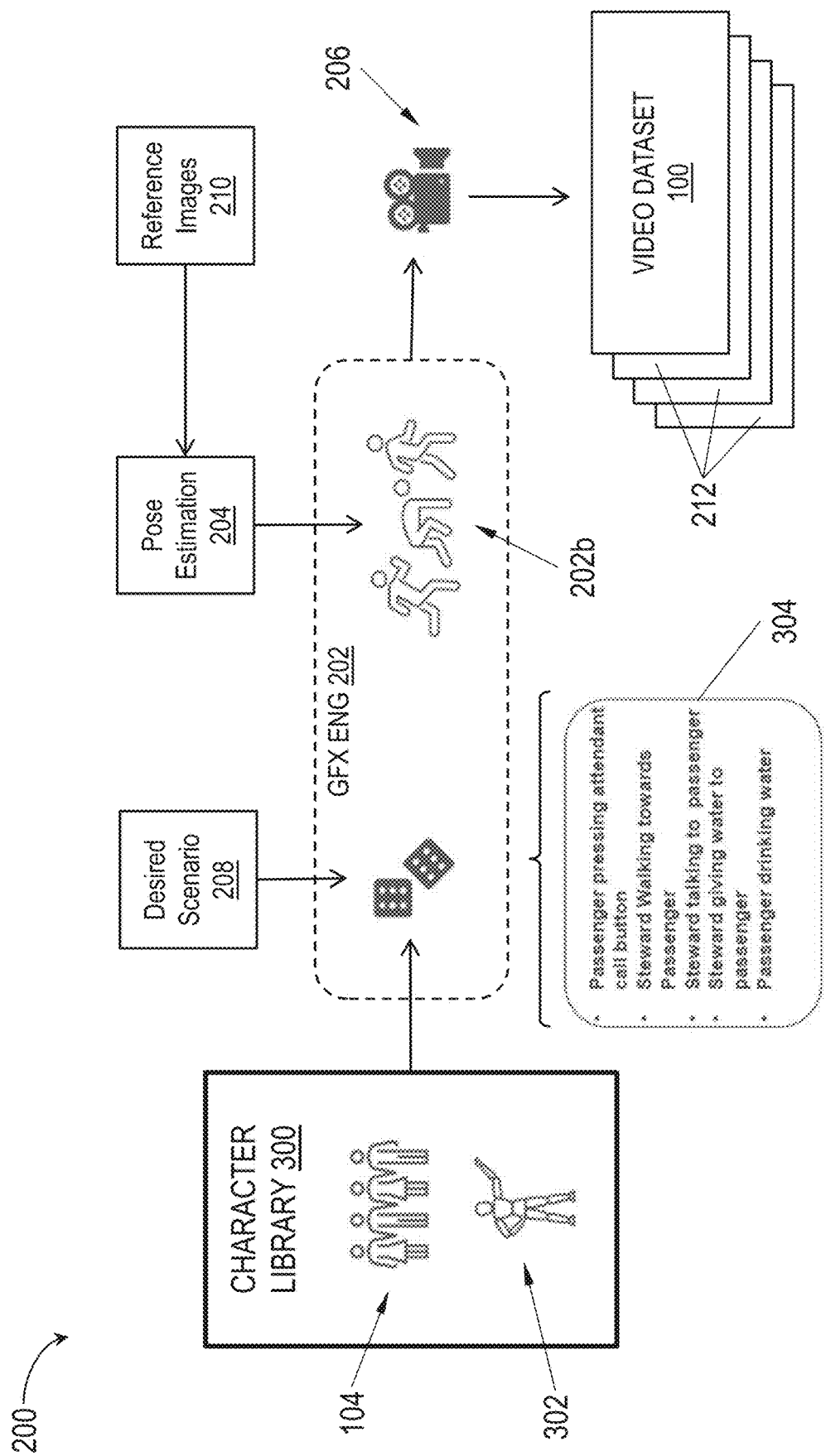
FIGS. 3A and 3B are diagrammatic illustrations of pose estimation and video automation operations of the system of FIG. 2.

Referring to FIG. 3A, the system 200 is shown.

In embodiments, the system 200 may, based on a desired scenario (208, FIG. 2) and subsequent to selecting an aviation environment (102, FIG. 1) and digital human characters 104 for inclusion in a video dataset 100, 212, assign character actions 302 (or sequences thereof) to the digital human characters in fulfillment of the desired scenario. For example, the library 300 of digital human characters 104 and/or aviation environments 102 may additionally include a library of character actions 302.

In embodiments, each character action 302 may be associated with a movement or sequence of movements performed by a digital human character 104. For example, a desired scenario 208 may be constructed as a complex sequence or combination (304) of component character actions 302. In embodiments, character actions 302 may be created or transferred based on pre-existing video or image streams (reference images 210) via a pose estimation module 204. For example, a character action 302 associated with putting on and fastening a seatbelt (112, FIG. 1) may originate with a reference image stream 210 showing a human subject performing the action. In embodiments, the pose estimation module 204 may infer a set of two-dimensional (2D) coordinates corresponding to joints of the human subject. Further, the pose estimation module 204 may be trained via machine learning techniques to infer a third axis and three-dimensional (3D) coordinates based on the 2D coordinate set, and to establish an underlying bone structure for character movements 202b while executing the character action 302. In embodiments, the 3D bone structure coordinates may be applied to a digital human character 104 such that the digital human character is portrayed executing the character action 302 (or combination 304 thereof), e.g., putting on and fastening the seatbelt 112.

In embodiments, the desired scenario 208 may be fulfilled by assembling a sequence or combination 304 of component character actions 302 from the library, e.g.: a seated passenger presses a call button; a cabin crewmember walks toward the passenger; the crewmember asks whether the passenger needs anything; the passenger requests a cup of water; the crewmember brings the cup to the passenger (e.g., the crewmember may already have a tray of cups in hand, or the crewmember may leave the passenger, return to a galley area, obtain a cup of water, and return to the passenger in an additional series of actions; the crewmember hands the cup to the passenger; the passenger drinks the water. For example, each individual character action 302 may be assembled as described above, e.g., by the graphics engine (202, FIG. 2), and rendered as a seamless video sequence (e.g., original video dataset 100, variant video datasets 212) by the video automation pipeline 206.

Figure 3B:
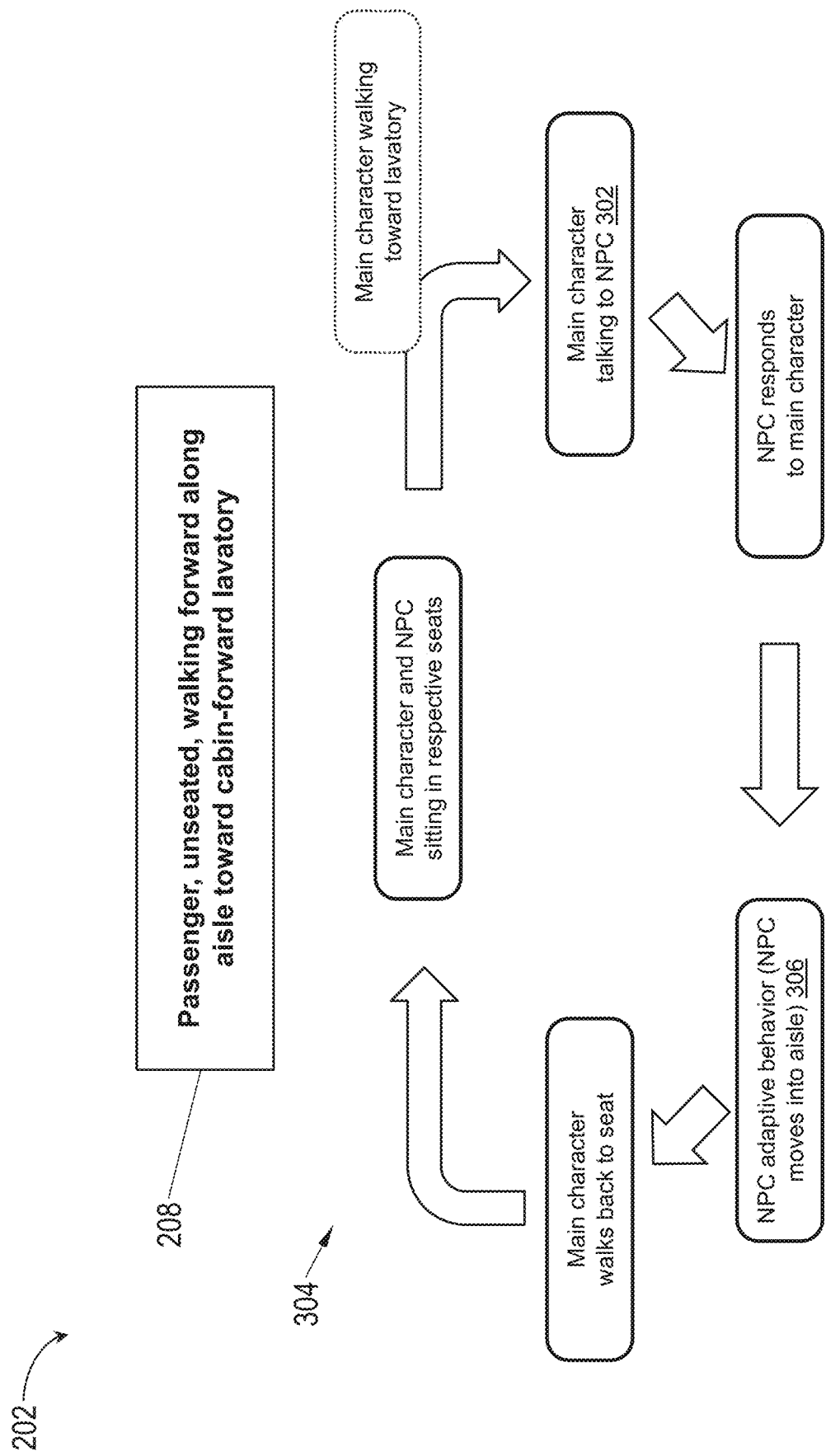

Referring also to FIG. 3B, in embodiments some character actions 302 or combinations 304 thereof may be dictated by the desired scenario 208 while others are randomized by the graphics engine 202. For example, each video dataset 100, 212 may include among its digital human characters 104 main characters (104a, FIG. 1) and auxiliary characters (104b, FIG. 1; e.g., non-player characters (NPC)). For example, the desired scenario 208 on which the video datasets 100, 212 are based may depict a passenger (e.g., main character 104a) unseated and walking forward toward a cabin-forward lavatory, as shown by FIG. 1). In embodiments, the main character/s 104a may carry out character actions 302 (or combinations 304 thereof) driven by the desired scenario 208; auxiliary characters 104b may interact with the main character 104a by performing adaptive actions or behaviors 306; alternatively or additionally, auxiliary characters may perform independent background actions as needed. For example, an auxiliary character 104b may be present in an adjacent seat, blocking the progress of the main character 104a toward the lavatory. The main character 104a may be depicted as addressing (302) the auxiliary character 104b, e.g., by requesting the auxiliary character move to make a path for the main character. The auxiliary character 104b may be trained, e.g., via machine learning models, and/or programmed according to desired behavior guidelines (e.g., introvert/extrovert, polite/belligerent), to react to the main character 104a with adaptive actions or behaviors 306. For example, the auxiliary character 104b may silently make room for the main character 104a by standing and moving out into the aisle (306), returning to their seat when the main character enters the aisle, and once again standing and moving into the aisle upon seeing the main character returning from the lavatory to their seat. In embodiments, background character actions may be AI-generated, e.g., selected by machine learning algorithms from a set of appropriate actions.

Figure 4:
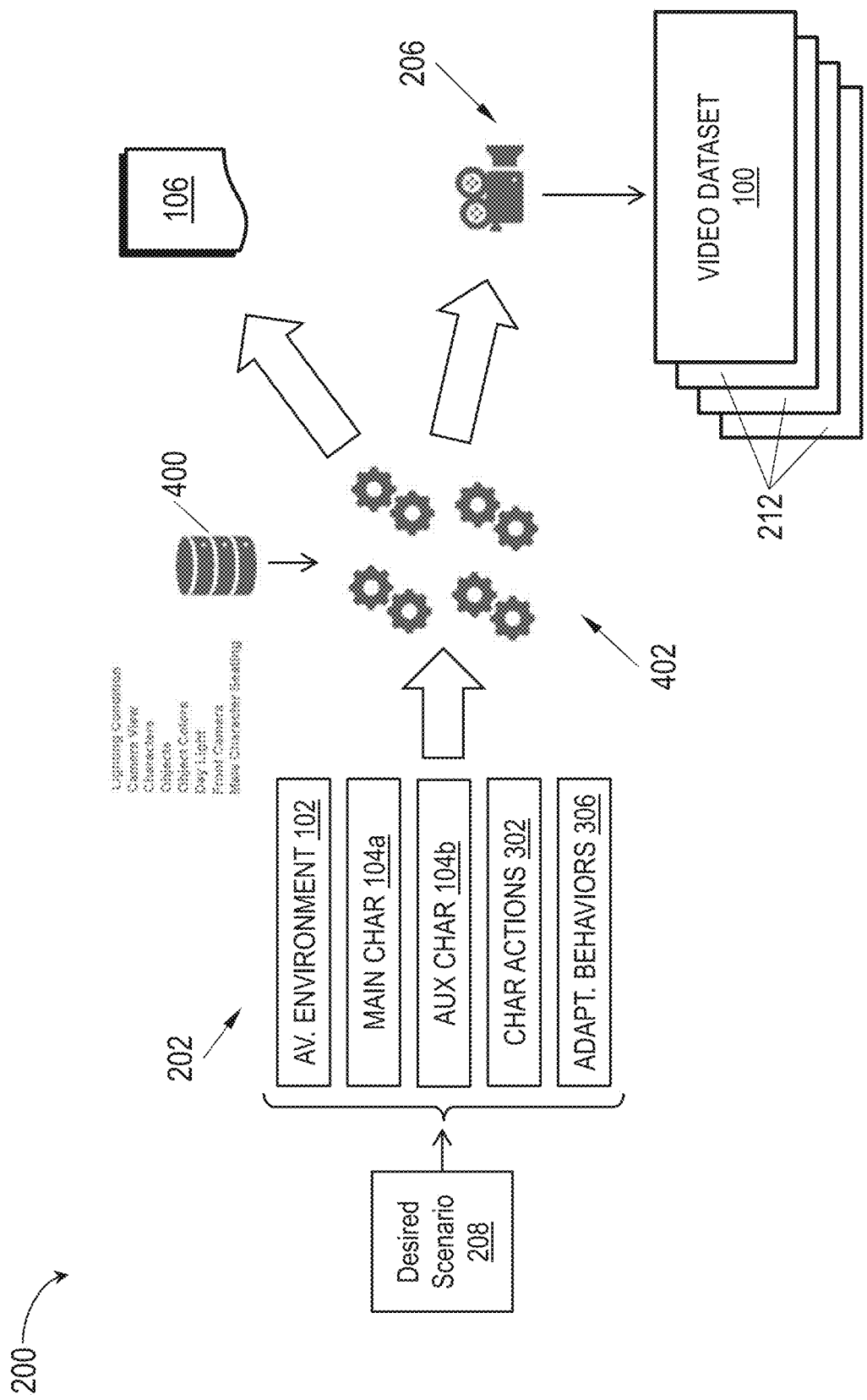
FIG. 4 is a diagrammatic illustration of the application of domain variations to the automated video generation operations of the system of FIG. 2.

Referring now to FIG. 4, the system 200 is shown.

In embodiments, a desired scenario 208 may include sets of domain variations 400. For example, the desired scenario 208 may provide for a specific sequence of character actions 302 (or combinations thereof, 304) performed by a specific set of characters (main characters 104a, auxiliary characters 104b; FIG. 1). However, domain variations 400 may not directly affect the substantive content of the video datasets 100, 212 but may provide variations on the content for machine learning algorithm training. For example, given the set of main characters 104a and sequence of character actions 302, the video dataset 100 may also be defined by a camera view, a lighting configuration, additional auxiliary characters (104b, FIG. 1), arrangement of free objects in the scene, color and appearance of said free objects, etc. The set of domain variations 400 may select different combinations (402) of these and other elements for the annotation file 106, such that the video automation pipeline 206 renders a set 212 of video datasets 100, 212 including the same character and action content but according to different combinations of domain variants, e.g., different camera angles, different lighting, main and auxiliary characters varied by ethnicity or gender, different background and/or object colors, different randomized arrangement of free objects within the scene.

Figure 5:
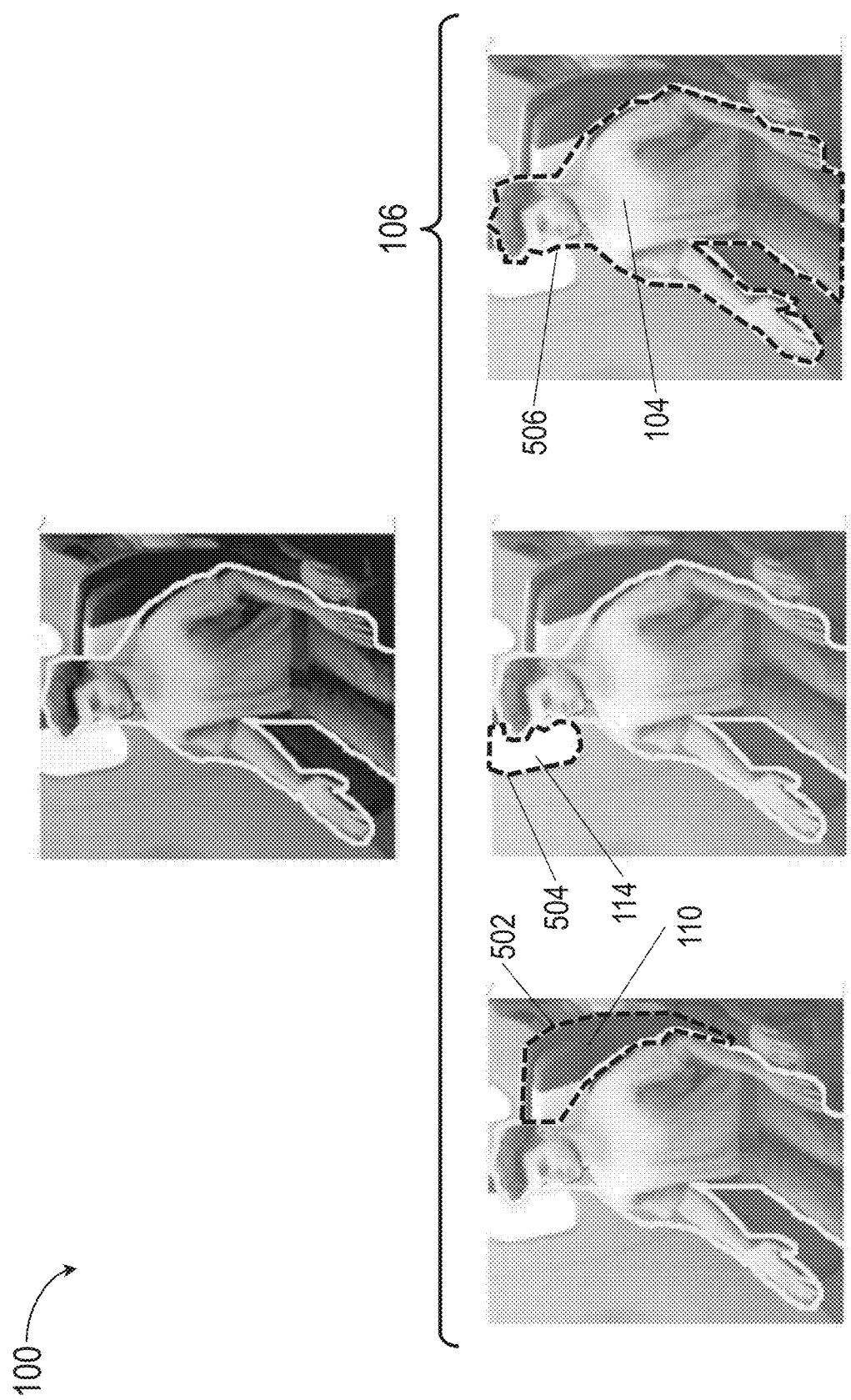
FIG. 5 is an illustration of an annotated frame of a video dataset generated by the system of FIG. 2.

Referring now to FIG. 5, the video dataset 100 is shown (e.g., a portion of a frame therefrom).

In embodiments, the annotation data (106, FIG. 1) for each dataset may include, in addition to semantic segmentation (e.g., character and action data as shown by FIG. 1), ground truth information including pixel segmentation and/or stereo/depth data. For example, within each frame 500 of a given video dataset 100, every pixel of the frame may be part of a pixel set 502 explicitly corresponding to a seat 110, a pixel set 504 explicitly corresponding to a window 114 or other fixture; a pixel set explicitly corresponding to a free object; or a pixel set 506 explicitly corresponding to a digital human character 104. In embodiments, the annotation data 106 may indicate to which pixel set 502, 504, 506 each pixel of the frame 500 belongs. Further, annotation data 106 may include depth data for each pixel in the frame 500, such that machine learning algorithms may perceive the video dataset 100 in three dimensions.

Figure 6:
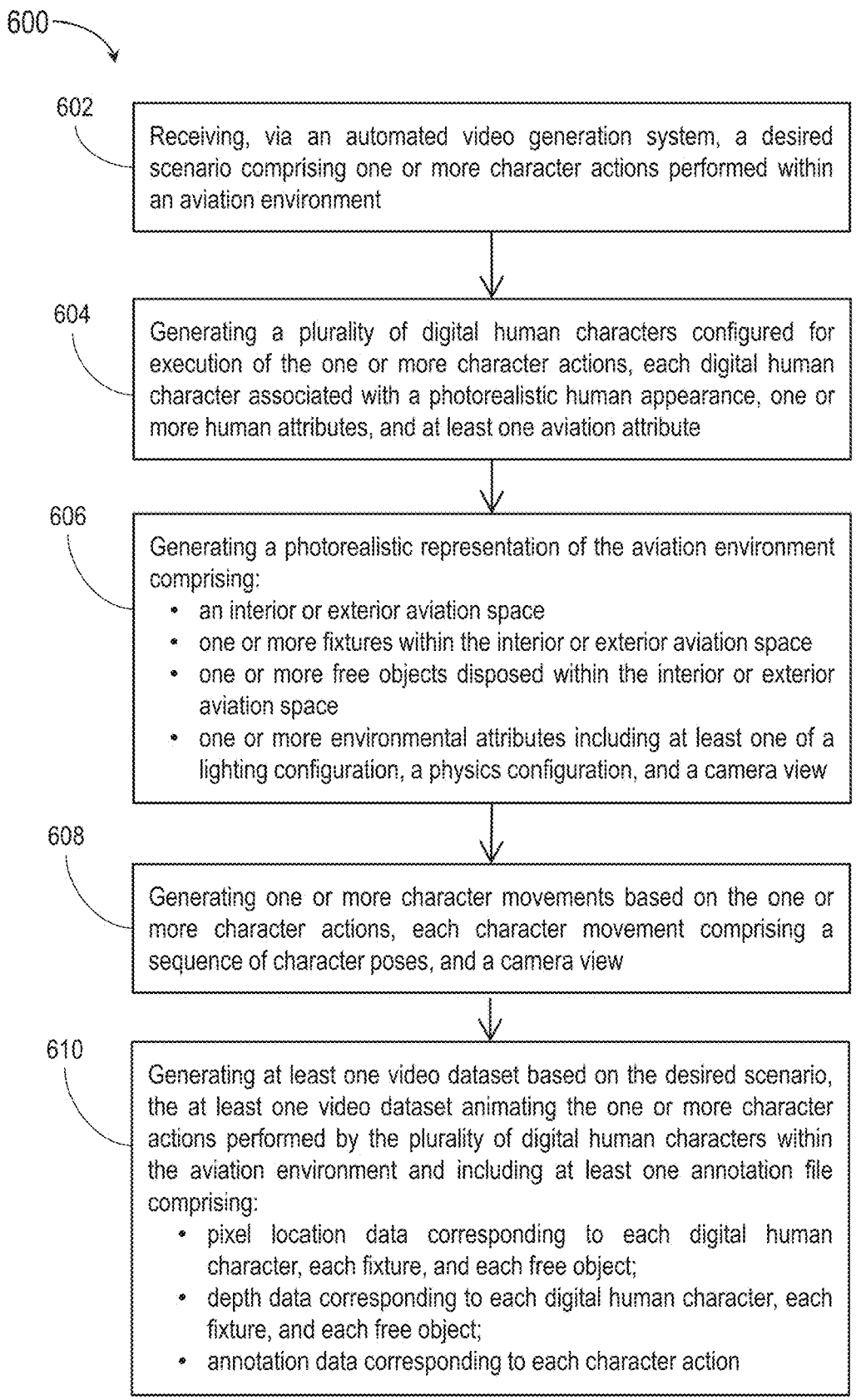
FIG. 6 is a flow diagram illustrating a computer-implemented method for automated video generation, in accordance with example embodiments of this disclosure.

Referring now to FIG. 6, the method 600 may be implemented by the system 200 and may include the following steps.

At a step 602, a desired scenario is received. For example, the desired scenario may indicate specific character actions to be portrayed in a specific aviation environment (e.g., aircraft cabin, cockpit, airport interior or exterior space).

At a step 604, the graphics engine generates a set of characters for performing the desired character actions. For example, main characters may perform the specific actions to be portrayed, while auxiliary characters react or respond to the main characters (or act independently in the background to simulate bystanders or other passengers). Main and auxiliary characters have a photorealistic human appearance (without corresponding to any identifiable humans) and a set of human attributes (e.g., build, ethnicity, appearance, dress, general behavior) and aviation attributes (characters may be pilots, command or cabin crew, passengers, mechanics, ground crew, or portray any other aviation or aviation-adjacent roles).

At a step 606, the graphics engine generates a photorealistic representation of the aviation environment, reflecting a particular lighting configuration, physics configuration, camera view, and/or other environmental attributes. The aviation environment includes both fixed and free objects, e.g., seats, bulkheads, windows and other aircraft components secured in place, as well as cups, personal items, bags, and other unsecured objects randomly placed throughout the aviation environment (and which may respond to events driven by the aircraft physics configuration).

At a step 608, pose estimation modules map character pose sequences onto the desired character actions, each main or auxiliary character action comprising a sequence of human poses and pose changes or transitions, each digital human character moving as a human would. For example, pose transitions may be adapted from image sequences or video clips of actual human activity or manually generated (e.g., if no appropriate or adaptable video is available).

At a step 610, the video automation pipeline generates a video dataset based on the selected digital human characters, aviation environment, and mapped pose transition sequences. For example, the video dataset portrays the specified character actions, performed by the main characters in the desired aviation environment, along with any responsive or background actions performed by auxiliary characters and/or events driven by the aviation environment (e.g., changes in lighting or aircraft physics). A video dataset may include variant video datasets, in which the same character actions as in the primary video dataset are portrayed but with domain variations in the digital human characters (e.g., different human attributes) and/or aviation environment (e.g., changes in lighting or physics) that differentiate each variant video dataset and the primary video dataset from each other. For example, in some embodiments, physics configurations may be adjusted based on an aircraft flight segment, an altitude, atmospheric conditions (e.g., presence of turbulence), and/or aircraft maneuvers. Each video dataset includes a detailed annotation file including annotation data for all character actions portrayed along with pixel location and depth data for each image element within the video dataset.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A computer-implemented method for automated video generation, the method comprising:
   receiving, via an automated video generation system, a desired scenario comprising one or more character actions to be simulated within an aviation environment;
   generating, via a graphics engine, a plurality of digital human characters configured for execution of the one or more character actions, each digital human character having a photorealistic human appearance, one or more human attributes, and at least one aviation attribute;
   generating, via the graphics engine, a photorealistic representation of the aviation environment comprising:
      an interior or exterior aviation space;
      one or more fixtures within the interior or exterior aviation space;
      one or more free objects disposed within the interior or exterior aviation space;
      and
      one or more environmental attributes including at least one of a lighting configuration, a physics configuration, and a camera view;
   generating, via the graphics engine, one or more character movements based on the one or more character actions, each character movement comprising an animated sequence of character poses;
   and
   generating, via a video automation pipeline, at least one video dataset based on the desired scenario, the at least one video dataset animating the one or more character actions performed by the plurality of digital human characters within the aviation environment and including at least one annotation file comprising:
      pixel location data corresponding to each digital human character, each fixture, and each free object;
      depth data corresponding to each digital human character, each fixture, and each free object;
      and
      annotation data corresponding to each character action.

2. The computer-implemented method of claim 1, wherein the plurality of digital human characters comprises:
   at least one main character configured for performance of the one or more character actions;
   and
   at least one auxiliary character configured for performance of at least one of:
      an adaptive action performed in response to the one or more character actions;
      or
      a background action performed independent of the one or more character actions.

3. The computer-implemented method of claim 1, wherein the aviation environment corresponds to an aircraft, and the physics configuration is configured to alter at least one of a gravity condition, a pressure condition, or an orientation of the aviation environment based on at least one of:
   a current flight segment;
   an atmospheric condition;
   or
   a maneuver of the aircraft.

4. The computer implemented method of claim 3, wherein the aviation environment is selected from a group including a cockpit, a galley, a lavatory, or a passenger cabin.

5. The computer-implemented method of 1, wherein the sequence of character poses is adapted from at least one reference image sequence portraying a human subject.

6. The computer-implemented method of claim 1, wherein the at least one video dataset comprises:
   a primary video dataset corresponding to the desired scenario;
   and
   one or more variant video datasets, the primary video dataset and each variant video dataset mutually differentiated by at least one domain variation selected from a group including:

a variation of the one or more free objects;
a variation of the one or more environmental attributes;
or
a variation of the one or more human attributes.

7. The computer-implemented method of claim 6, wherein the variation of the one or more free objects includes one or more of:
a location of each free object relative to the aviation environment;
or
an appearance or non-appearance of at least one free object.

8. The computer-implemented method of claim 1, wherein the one or more human attributes are selected from a group including:
a gender of the digital human character;
an ethnicity of the digital human character;
an age of the digital human character;
a physical build of the digital human character;
or
a dress of the digital human character.

9. The computer-implemented method of claim 1, wherein the at least one aviation attribute is selected from a group including:
a pilot;
a command crewmember;
a cabin crewmember;
or
a passenger.

10. A system for automated video generation, the system comprising:
a graphics engine comprising one or more processors;
a memory configured for storage of encoded instructions executable by the one or more processors, the encoded instructions configured for causing the one or more processors to:
receive a desired scenario comprising one or more character actions to be simulated within an aviation environment;
generate a plurality of digital human characters configured for execution of the one or more character actions, each digital human character having a photorealistic human appearance, one or more human attributes, and at least one aviation attribute;
generate a photorealistic representation of the aviation environment comprising:
an interior or exterior aviation space;
one or more fixtures within the interior or exterior aviation space;
one or more free objects disposed within the interior or exterior aviation space;
and
one or more environmental attributes including at least one of a lighting configuration, a physics configuration, and a camera view;
generate one or more character movements based on the one or more character actions, each character movement comprising an animated sequence of character poses;
and
generate at least one video dataset based on the desired scenario, the at least one video dataset animating the one or more character actions simulated by the plurality of digital human characters within the aviation environment and including at least one annotation file comprising:
pixel location data corresponding to each digital human character, each fixture, and each free object;
depth data corresponding to each digital human character, each fixture, and each free object;
and
annotation data corresponding to each character action.

11. The system of claim 10, wherein the plurality of digital human characters includes:
at least one main character configured for performing the one or more character actions;
and
at least one auxiliary character configured for performing at least one of:
an adaptive action performed in response to the one or more character actions;
or
a background action performed independently of the one or more character actions.

12. The system of claim 10, wherein the aviation environment corresponds to an aircraft, and the physics configuration is configured to alter at least one of a gravity condition, a pressure condition, or an orientation of the aviation environment based on at least one of:
a current flight segment;
an atmospheric condition;
or
a maneuver of the aircraft.

13. The system of claim 12, wherein the aviation environment is selected from a group including a cockpit, a galley, a lavatory, or a passenger cabin.

14. The system of claim 10, wherein the sequence of character poses is adapted from at least one reference image sequence portraying a human subject.

15. The system of claim 10, wherein the at least one video dataset comprises:
a primary video dataset corresponding to the desired scenario;
and
one or more variant video datasets, the primary video dataset and each variant video dataset mutually differentiated by at least one domain variation selected from a group including:
a variation of the one or more free objects;
a variation of the one or more environmental attributes;
or
a variation of the one or more human attributes.

16. The system of claim 15, wherein the variation of the one or more free objects includes one or more of:
a location of each free object relative to the aviation environment;
or
an appearance or non-appearance of at least one free object.

17. The system of claim 10, wherein the one or more human attributes are selected from a group including:
a gender of the digital human character;
an ethnicity of the digital human character;
an age of the digital human character;
a physical build of the digital human character;
or
a dress of the digital human character.

18. The system of claim 10, wherein the at least one aviation attribute is selected from a group including:

a pilot;
a command crewmember;
a cabin crewmember;
or
a passenger.

* * * * *